April 26, 1966  S. A. CANFIELD  3,248,191

FEEDER FOR MELTING GLASS SPHERES FOR FIBER DRAWING

Original Filed May 9, 1962

INVENTOR
SHELDON A. CANFIELD
BY
ATTORNEYS

United States Patent Office 3,248,191
Patented Apr. 26, 1966

3,248,191
FEEDER FOR MELTING GLASS SPHERES FOR FIBER DRAWING
Sheldon A. Canfield, Newark, Ohio, assignor to Owens-Corning Fiberglas Corporation, a corporation of Delaware
Continuation of application Ser. No. 193,530, May 9, 1962. This application Mar. 4, 1965, Ser. No. 437,033
5 Claims. (Cl. 65—1)

The present application is a continuation application of my allowed copending application, Serial Number 193,530, filed May 9, 1962, now abandoned, entitled, "Feeder for Melting Glass Spheres for Fiber Drawing."

This invention relates to the production of fibers from thermoplastic materials and more particularly to a feeder for conditioning the thermoplastic material for the production of these fibers.

Although this invention will be described with particular reference to the production of fibers from glass, the principles of this invention are equally applicable to the production of fibers from other organic and inorganic materials wherein they are formed by attenuation from a molten supply source.

One often used process for the production of glass fibers utilizes preformed, cold, marbles of glass which are supplied to a feeder and melted therein. These marbles are produced by supplying the raw glass forming batch materials to one end of a large glass tank. The raw materials are progressively moved through the glass tank while being melted and combined to form a homogeneous pool of molten glass at the opposite end of the glass tank. Molten glass flows from this homogeneous pool as a rather large stream. This stream is cut into short lengths which are fed to a marble forming machine which rolls the cut lengths of hot glass into an annular shape and cools them.

These marbles of refined glass are supplied to a suitable feeder having many orifices in the bottom and are melted therein. The molten glass flows through the orifices in the bottom of the feeder as a plurality of tiny streams which are attenuated to form fine filaments. These fine filaments are coated with a suitable protective sizing material and combined into a flexible strand which is collected on the attenuating collet.

The remelting of the marbles of glass in this feeder is a rather complex operation. In order to have a continuous operation, free from interruptions, these marbles must be rapidly and completely melted and conditioned and the glass from all of the marbles recombined to form a homogeneous, free flowing glass that is free from seeds, stones, and other impurities common to the glass making trades. This conditioning of the glass into a homogeneous mass, free from impurities, is especially important when producing glass fibers because the orifices in the bottom of the feeder, through which the melted glass flows, are very small and are easily plugged by impurities in the glass and even viscous cords of glass that may be invisible to the naked eye. These irregularities in the glass are eliminated by "cooking" it for a sufficient length of time that the fluxes in the glass will react with the impurities and break them down to form a homogeneous mass of molten glass. The length of time the glass must be "cooked" depends upon the temperature at which it is being "cooked" as the action of these fluxes progresses much more rapidly at high temperatures. In order to promote this rapid dissolving of the impurities, the melting marbles in the top of the feeder are heated to a temperature several hundred degrees higher than the temperature at which the glass fibers are formed. The glass is then cooled in the lower part of the feeder to the desired temperature for forming the glass fibers.

The feeders in which the marbles are melted are generally constructed from an expensive platinum alloy and in order to provide the most economical process it is necessary to keep the size of the feeder small so that the minimum amount of metal is used. Further, it is desirable to flow as much glass as possible through each feeder to keep the number of feeders used to a minimum.

In order to maintain this high rate of flow of the glass through these small feeders it is necessary to supply heat from the feeder to the melting glass at a very high rate. The feeders are generally heated by passing large quantities of electrical current through their walls from a suitable electrical supply source. This current heats the walls of the feeder to a temperature generally higher than the melting glass and most of this heat is transferred to the glass from the side walls of the feeder. The glass near the walls of the feeder is heated to a large extent by radiation directly from the side walls of the feeder. This heat must be in turn re-radiated or transferred by solid conduction to the remainder of the glass. It has been found that improved feeders for melting these cold marbles of glass can be constructed by incorporating additional heating elements in the top portion of the feeder. One form of heating element heretofore used is a heated perforated screen in the top section of the feeder. This screen supplies heat to the downwardly facing side of the marbles thereby aiding in melting them.

Feeders built in accordance with the instant invention have heating elements in the top section feeder for supplying heat to two sides of the cold marble. This supply of heat to two sides of the melting marble increases the melting efficiency of the feeder. The transfer of heat to the marble from two sides increases the rate at which the marble is heated, thereby increasing the throughput for the feeder.

The heating elements of this invention are installed so that the melting glass marble will be retained immediately between them. Further, they are contoured so that as the size of the cold section of the marble is diminished, it will remain in or nearly in contact with the heating elements. By so contouring the heating elements it is assured that the rapid and efficient transfer of heat to the cold glass will not be hampered by glass between it and the heating element. Thus, heat will continue to be efficiently transferred to the melting marble from at least two heating elements until it is almost completely melted.

An object of this invention is to provide an improved feeder for melting cold spherical bodies of glass.

A further object of this invention is to provide an improved feeder for supplying streams of molten mineral material in fiber forming condition.

Another object of this invention is to provide a feeder for molten glass having auxiliary heating elements near its top for supplying additional heat for melting said glass.

Another object of this invention is to provide a feeder for melting cold sperical bodies of glass wherein heat for melting them is supplied immediately adjacent said bodies on at least two sides.

A further object of this invention is to provide a feeder having auxiliary heating members adapted to receive cold spherical bodies of glass and retain them until they are almost completely melted.

An object of this invention is to provide an improved feeder for melting cold spherical bodies of glass having auxiliary heating elements in its upper section wherein at least some of the heating elements are contoured so that the cold unmelted portions of said bodies of glass are always immediately adjacent at least two of said heating elements.

Further objects and advantages which are within the scope of this invention and variations thereof will become apparent from a consideration of the specification and drawings of several forms of this invention, one of which may be preferred, in which.

Figure 1:
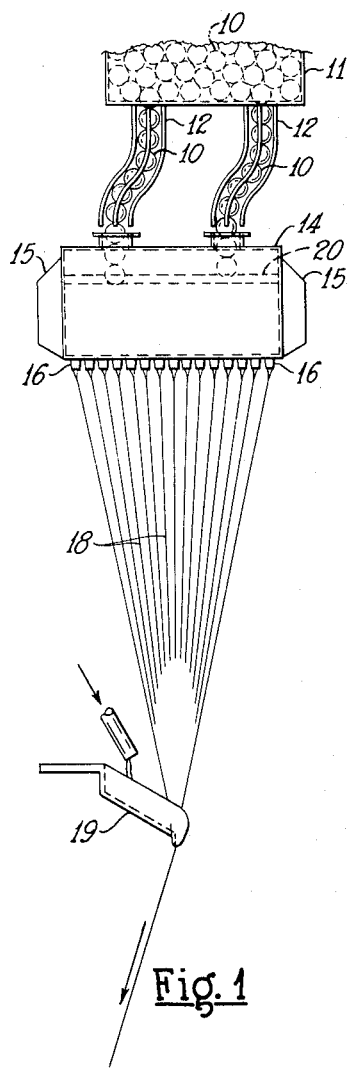
FIGURE 1 is an elevational view of the marble melting feeder including the marble supply hopper and other auxiliary equipment for supplying the cold marbles to the feeder.

Referring in greater detail to FIGURE 1, the cold preformed marbles 10 are stored in a marble storage hopper 11. The marbles flow in a controlled manner through marble supply chutes 12. These marbles enter the molten glass supply feeder 14 through openings in its top wall. The feeder is positioned so that these openings are immediately below the exits from the marble supply chutes 12. Electrical power is supplied to the end walls of the feeder through ears or terminals 15 from an electrical power supply source (not shown). This electrical current flows through the sidewalls and endwalls of the feeder, and resistance heats them to a temperature above that of the melting glass. This heat from the walls of the feeder is transferred to the cold marbles of glass thereby melting them. Additional heating elements, which may be in the form of heating strips 20, are positioned in the upper section of the feeder for supplying additional heat immediately adjacent the melting marbles. The molten glass flows from the feeder through tips 16 welded to its bottom wall. The glass flowing from these tips is attenuated into a plurality of fine glass filaments 18 and collected on a suitable revolving collet (not shown) positioned beneath the feeder. A suitable protective binder or size is applied to the filaments by the binder applicator 19.

It is essential to the economical production of glass fibers that the cold marbles be rapidly and completely melted in the feeder to form a homogeneous pool of molten glass in the feeder from which the filaments can be attenuated. The additional heating strips 20 positioned in the top of the feeder aid in rapidly and completely melting the marbles of glass as is hereinafter described. These melting strips are welded to the end walls of the feeder and are heated by electrical current flowing through them. This electrical power heats the strips to a temperature somewhat higher than the melting temperature of the glass from which the marbles are made.

Figure 2:
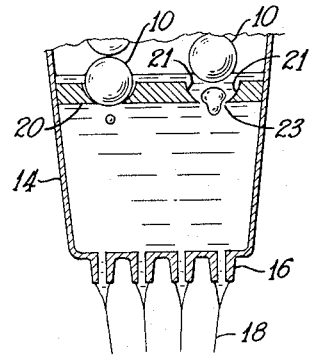
FIGURE 2 is a sectional elevational view of a marble melting feeder showing a form of the heater strips of this invention.

FIGURE 2 illustrates in greater detail a form of the melting strips of this invention. The strips 20 are quite thick and their edges 21 are contoured so that as the edges of the marble melt and the cold unmelted portion decreases in size and descends through the openings 23 between these heating strips, the edges of the heating strips 21 will always be in or nearly in contact with the cold glass. In this way the heating effect of the hot melting strip will not be diluted by glass insulating the cool marble from the heat source. Thus, cold portion of the marble will continue to be rapidly and effectively heated by the melting strips 20.

The heating strips 20 are preferably located in the top section of the feeder and submerged just beneath the surface of the molten glass. When so located, they are advantageously positioned for receiving the cold marbles of glass. Further, the molten glass will aid in preventing oxidation and volatilization of the metal. Also, the molten glass above the melting marble will insulate it and prevent the loss of an excessive amount of heat from it.

The bottom edges of the heating strips are positioned so that the molten glass will readily flow between them while retaining between them all but very small bits of unmelted glass. By so restricting the opening, any unmelted glass that does flow from between them will be thoroughly melted and be an integral part of the homogeneous mass of molten glass before it reaches the orifices in the bottom wall of the feeder.

Figure 3:
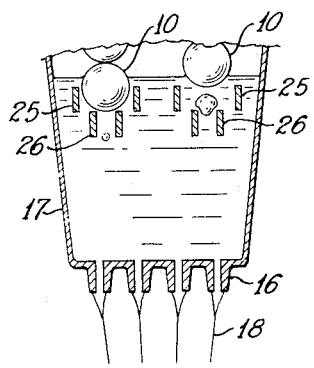
FIGURE 3 is a sectional elevational view of a feeder showing two levels of heater strips arranged in accordance with this invention.

FIGURE 3 illustrates another arrangement of the heating strips for supplying heat for melting the marbles of glass. In this arrangement a pair of vertical heated strips 25 are positioned in the top section of a feeder 17. These strips are spaced far enough apart that a cold marble will slide between them. The heat from these strips will rapidly melt the marble and when the size of the unmelted core has decreased to such an extent that the efficient transfer of heat from the heating strips 25 to the partially melted glass marble is impaired by the intervening molten glass, the cold, unmelted core will slide down between a second pair of heating strips 26 positioned immediately beneath the first set of strips. This lower pair of heating strips is positioned somewhat closer together so that they will be immediately adjacent the edges of the cold, unmelted core of glass after it slides between them. Being so positioned, the heat from these strips will be efficiently transferred to the unmelted core which will be rapidly melted. Thus, this arrangement of heating strips provides for the continued efficient transfer of heat to the melting core even though the size of the core has been decreased considerably by the melting off of the outer glass. After passing between the lower set of heating strips, very little unmelted glass will remain and what is still unmelted will be quickly melted and assimilated by the molten glass in the feeder.

Figure 4:
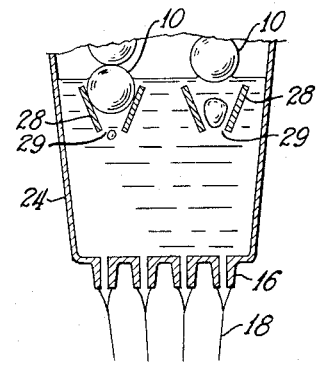
FIGURE 4 is a sectional elevational view of a feeder illustrating another form of the melting strips of this invention.

FIGURE 4 illustrates a feeder 24 with a slightly different arrangement of auxiliary heating strips 28. As shown, these heating strips 28 are arranged in a general V-shape with a longitudinal opening 29 in the apex. The top of the V is open far enough to receive a fresh, cold marble as delivered to the feeder. The cold marbles of glass 10 will descend into open V until their sides contact the heating strips 28. This intimate contact with the heating strips assures that the heat from them will be rapidly and efficiently transferred to the melting marble. As the marble melts and decreases in size, it will descend still farther between the heating strips 28. However, regardless of the size of the unmelted portion, it will always be in contact with the heating strips.

Figure 5:
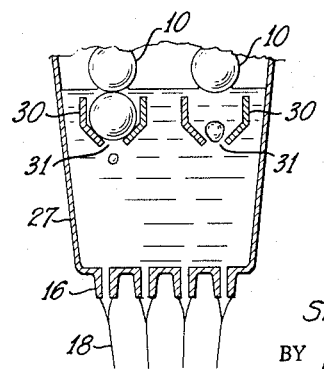
FIGURE 5 is a sectional elevational view of a feeder illustrating still another form of the heating strips of this invention.

FIGURE 5 illustrates a modification of the auxiliary heating members of this invention. These heating strips 30 are welded to the end walls of the feeder and have a vertical top section which is spaced so that cold, fresh glass marbles 10 will fit between them. The bottom portions of these heating members are bent inwardly, leaving a small longitudinal opening 31 between them. In operation the cold marbles of glass slide down between the heating members and are retained therebetween by the inwardly bent bottom portions. When so positioned, the glass marbles are heated directly from both sides and the bottom by these heating strips. The inwardly bent bottom portions of the heating members retain the unmelted core of glass between heating members so that heat can be supplied thereto from both sides to rapidly melt the glass.

It is apparent that within the scope of this invention, modifications and different arrangements of the auxiliary heating members may be made other than as herein disclosed, the present disclosure being merely illustrative, the invention comprehending all variations thereof.

I claim:

1. A feeder for supplying molten mineral material in fiber forming condition comprising:
    an elongated chamber having at least one opening in its top wall through which said mineral material is supplied to said chamber as a plurality of cold, spherical bodies, a bottom wall for said chamber having a plurality of orifices through which said molten material is supplied as a plurality of streams, terminals for receiving electrical current attached to the end walls of said feeder, at least one pair of auxiliary metal heating strips located in the top section of the chamber immediately under the surface of the molten mineral material, said auxiliary heating strips comprising flat metal strips, extending between the end walls of the chamber and being attached thereto with the major face of each strip facing its mate, said strips being separated only slightly farther than the diameter of said cold spherical bodies, a second pair of auxiliary heating strips positioned immediately below said first pair, said second pair of heating strips being similarly oriented and being positioned close enough together that said spherical bodies must be at least partially melted to fit between them.

2. A feeder for supplying molten mineral material in fiber forming condition comprising:

an elongated enclosed chamber having a top wall with openings therein for receiving cold spherical bodies of said mineral material, a bottom wall with orifices therein through which said molten mineral material is supplied as a plurality of streams, electrical terminals connected to the endwalls of said chamber for receiving electrical power for heating said chamber, at least one pair of flat metal auxiliary heating strips in the top portion of said chamber immediately below the surface of the molten glass, said heating strips extending between the endwalls of said chamber and being connected thereto, the top portion of each of said heating strips being generally vertically oriented and the bottom portion being bent generally inward toward the opposing heating strip, the distance between the vertical portions of said strips being only slightly greater than the original diameter of the cold spherical bodies of said mineral material.

3. A feeder for supplying molten mineral material in fiber forming condition comprising:

an elongated chamber having at least one opening in its top wall through which said mineral material is supplied to said chamber as a plurality of cold, spherical bodies, a bottom wall for said chamber having a plurality of orifices through which said molten material is supplied as a plurality of streams, terminals for receiving electrical current attached to the end walls of said feeder and a plurality of parallel spaced auxiliary heating members located in the top portion of said chamber immediately below the surface of the molten glass, said auxiliary heating members, extending in side-by-side relationship between end walls of said chamber, defining a slot therebetween, said slot having adjacent facing surfaces of opposite concave contour, the upper edge of said surfaces being separated a distance only slightly farther than the diameter of said cold spherical bodies whereby substantial surface contact between said cold bodies and said members is provided as said body melts and proceeds downwardly between said slot.

4. A feeder for supplying molten mineral material in fiber forming condition comprising:

an elongated chamber having at least one opening in its top wall through which said mineral material is supplied to said chamber as a plurality of cold, spherical bodies, a bottom wall for said chamber having a plurality of orifices through which said molten material is supplied as a plurality of streams, terminals for receiving electrical current attached to the end walls of said feeder, and a plurality of auxiliary heating members located in the top portion of said chamber immediately below the surface of the molten glass, said members lying in side-by-side, parallel spaced relationship between the end walls of said chamber and defining an elongated groove between each pair, said groove having facing edges defining a curve commencing at the top of said member and proceeding downwardly and inwardly toward the opposite edge at the bottom of said member, said groove at the top edge being just receptive of said cold spherical bodies providing appreciable surface contact between the edges and the cold spherical bodies, said groove having an open bottom of a dimension less than the diameter of the cold spherical bodies.

5. A feeder for supplying molten mineral material in fiber forming condition comprising:

an elongated enclosed chamber having a top wall with openings therein for receiving cold, spherical bodies of said mineral material, a bottom wall with a plurality of openings therein through which said molten mineral material is supplied as a plurality of streams, terminals connected to the end walls of said feeder for receiving electrical power for heating said chamber, at least one pair of auxiliary flat metal heating strips in the top section of said chamber and extending between the end walls thereof for supplying additional heat for melting material in said chamber, said heating strips being oriented to form a V-shaped opening between them, the top portions being spaced just far enough apart to permit said spherical bodies to fit between them.

References Cited by the Examiner

UNITED STATES PATENTS

| | | | |
|---|---|---|---|
| 2,253,176 | 8/1941 | Graves. | |
| 3,028,442 | 9/1962 | Glaser | 65—2 |
| 3,186,823 | 6/1965 | Novac | 65—335 |

HOWARD R. CAINE, *Acting Primary Examiner.*

DONALL H. SYLVESTER, *Examiner.*